US011394047B2

(12) United States Patent
Zhou et al.

(10) Patent No.: US 11,394,047 B2
(45) Date of Patent: Jul. 19, 2022

(54) NEGATIVE ELECTRODE ADDITIVE FOR A LITHIUM ION SECONDARY BATTERY AND A NEGATIVE ELECTRODE SLURRY CONTAINING THE SAME

(71) Applicant: MURATA MANUFACTURING CO., LTD., Kyoto (JP)

(72) Inventors: Yan Zhou, Shanghai (CN); Li Wang, Shanghai (CN); Yuli Li, Shanghai (CN); Huayu Sun, Shanghai (CN)

(73) Assignee: Murata Manufacturing Co., Ltd., Kyoto (JP)

( * ) Notice: Subject to any disclaimer, the term of this patent is extended or adjusted under 35 U.S.C. 154(b) by 177 days.

(21) Appl. No.: 16/786,189

(22) Filed: Feb. 10, 2020

(65) Prior Publication Data

US 2020/0266481 A1    Aug. 20, 2020

(30) Foreign Application Priority Data

Feb. 15, 2019  (CN) .......................... 201910118861.2

(51) Int. Cl.
| H01M 4/134 | (2010.01) |
| H01M 4/137 | (2010.01) |
| H01M 4/38 | (2006.01) |
| H01M 4/62 | (2006.01) |
| H01M 4/02 | (2006.01) |
| H01M 10/0525 | (2010.01) |
| H01M 10/0567 | (2010.01) |

(52) U.S. Cl.
CPC ....... H01M 10/0525 (2013.01); H01M 4/134 (2013.01); H01M 4/137 (2013.01); H01M 4/386 (2013.01); H01M 4/621 (2013.01); H01M 10/0567 (2013.01); *H01M 2004/027* (2013.01)

(58) Field of Classification Search
CPC ...... H01M 4/134; H01M 4/137; H01M 4/139; H01M 4/386; H01M 4/62; H01M 4/621; H01M 10/0525; H01M 10/0567; H01M 2004/027; Y02E 60/10
See application file for complete search history.

(56) References Cited

U.S. PATENT DOCUMENTS

2020/0136145 A1*  4/2020  Ohta ..................... C08F 8/12

FOREIGN PATENT DOCUMENTS

| CN | 102651476 A | | 8/2012 |
| CN | 102938473 | * | 2/2013 |
| JP | 55-133769 | * | 10/1980 |
| JP | 07201364 | | 8/1995 |
| JP | 10-064546 | * | 3/1998 |
| JP | H1064546 A | | 3/1998 |
| JP | 2013149416 A | | 8/2013 |
| JP | 2020129479 | | 8/2020 |
| WO | 2018225539 | | 12/2018 |

OTHER PUBLICATIONS

Machine translation of JP2013-149416, published on Aug. 1, 2013 (Year: 2013).*
Machine translation of CN 102938473, published on Feb. 20, 2013 (Year: 2013).*
Machine translation of JP10-064546, published on Mar. 6, 1998 (Year: 1998).*
Machine translation of JP 55-133769, published on Oct. 17, 1980 (Year: 1980).*
Japanese Office Action dated Jan. 12, 2021 in corresponding Japanese Application No. 2020-018744.
Search Report dated Jan. 12, 2021 in corresponding Japanese Application No. 2020-018744.

* cited by examiner

Primary Examiner — Anca Eoff
(74) Attorney, Agent, or Firm — K&L Gates LLP

(57) ABSTRACT

The present disclosure provides a negative electrode additive for a lithium ion secondary battery and a negative electrode slurry containing the same. The negative electrode additive for a lithium ion secondary battery contains one of a lignin-based substance or a humic acid-based substance or a combination thereof. By means of the negative electrode additive for a lithium ion secondary battery and the negative electrode slurry for a lithium ion secondary battery containing the same of the present disclosure, effects of improving electrical performance of a lithium ion secondary battery at normal temperature and at a low temperature, and improving peel strength of the lithium ion secondary battery are achieved.

6 Claims, 2 Drawing Sheets

NEGATIVE ELECTRODE ADDITIVE FOR A LITHIUM ION SECONDARY BATTERY AND A NEGATIVE ELECTRODE SLURRY CONTAINING THE SAME

INCORPORATION BY REFERENCE

This application claims the benefit of Chinese Patent Application No. 201910118861.2, filed on Feb. 15, 2019, and titled "A Negative Electrode Additive for a Lithium Ion Secondary Battery and a Negative Electrode Slurry Containing the Same", the entire contents of which are incorporated by reference herein.

TECHNICAL FIELD

The present disclosure relates to the field of lithium ion secondary batteries, and in particular, to a negative electrode additive for a lithium ion secondary battery and a negative electrode slurry containing the same.

BACKGROUND

In recent years, along with continuous development of the electronic technology, the requirements for a battery device for supporting energy supply of an electronic device are also continuously increased. Nowadays, batteries capable of storing a high amount of electricity and outputting high power are desired. Traditional lead-acid battery and nickel-metal hydride battery and the like cannot meet the requirements of a new-type electronic product. Therefore, a lithium battery has been attracted an extensive attention. During the development of the lithium battery, capacity and performance thereof have been more effectively improved.

The lithium batteries in the prior art may be classified as two types: a lithium metal battery and a lithium ion battery. The lithium metal battery uses lithium metal or lithium alloy as a negative electrode, and the hazard thereof is large, thus it is rarely applied to an electronic product in daily life. The lithium ion battery does not contain lithium in a metallic state. In generally, the lithium ion battery uses a lithium alloy metallic oxide as a positive electrode material, and uses graphite as a negative electrode material. However, a common lithium ion secondary battery still has many defects. For example, electrical performance of the existing lithium ion secondary battery at room temperature (normal temperature) and at a low temperature may still not be entirely desirable, and during a using process, a problem that peel strength of the negative electrode is excessively low so that the electrical performance is reduced still occurs.

In a process of manufacturing the lithium ion secondary battery of the prior art, the electrical performance of the battery is improved by adding propylene carbonate into the negative electrode slurry generally. However, such method still has limitation, and is insufficient to meet the requirements of the electrical performance and the peel strength of the lithium ion secondary battery.

SUMMARY

A main object of the disclosure is to provide a negative electrode additive for a lithium ion secondary battery and a negative electrode slurry containing the same, so as to solve problems in the prior art that electrical performance of a lithium ion secondary battery at room temperature (normal temperature) and at a low temperature is inadequate and peel strength is lower.

For achieving the above object, according to one aspect of the disclosure, a negative electrode additive for a lithium ion secondary battery is provided, the negative electrode additive for a lithium ion secondary battery comprises one or more of a lignin-based substance, a humic acid-based substance (i.e., humic substance), or a combination thereof.

Further, in the negative electrode additive for a lithium ion secondary battery described above, the lignin-based substance contains one or more of Nat $K^+$, $Ca^+$, $NH^{4+}$ and $Mg^{2+}$, and one or more of carboxyl, hydroxyl, carbonyl and sulfonic group.

Furthermore, in the negative electrode additive for a lithium ion secondary battery described above, the lignin-based substance is sodium lignin sulfonate.

Still, in the above described negative electrode additive for a lithium ion secondary battery, wherein the humic acid-based substance comprises a humic acid, an ulmic acid, and a fulvic acid.

Further still, in the negative electrode additive for a lithium ion secondary battery described above, wherein the amount of the negative electrode additive is from about 0.05 wt % to about 5 wt %, based on the total weight of the negative electrode active substance.

Further, in the negative electrode additive for a lithium ion secondary battery, the additive described above comprises the lignin-based substance and the humic acid-based substance.

Furthermore, in the negative electrode additive for a lithium ion secondary battery described above, the weight ratio of the lignin-based substance and the humic acid-based substance ranges from about 30:70 to about 80:20.

According to another aspect of the disclosure, a negative electrode slurry for a lithium ion secondary battery is provided. The negative electrode slurry for a lithium ion secondary battery comprises the negative electrode additive for a lithium ion secondary battery described above, a negative electrode active substance, a binder, a thickener, and a conductive agent.

Further, the negative electrode slurry for a lithium ion secondary battery described above comprises about 85-95 parts by weight of the negative electrode active substance, about 1-5 parts by weight of the binder, about 1-5 parts by weight of the thickener, and about 1-5 parts by weight of the conductive agent, and the amount of the negative electrode additive for a lithium ion secondary battery is form about 0.05 wt % to about 5 wt % of the total weight of the negative electrode active substance.

Furthermore, in the negative electrode slurry for a lithium ion secondary battery, the negative electrode active substance described above comprises one or more of hardly graphitizable carbon, easily graphitizable carbon, graphite, pyrolytic carbon, coke, glassy carbon, fired bodies of organic polymers, a carbon fiber, active carbon, a graphite containing a silicon-based material, and the silicon-based material.

By using the negative electrode additive for a lithium ion secondary battery and the negative electrode slurry for a lithium ion secondary battery of the disclosure, effects of improving electrical performance of a lithium ion secondary battery at normal temperature and at a low temperature, and improving peel strength of the lithium ion secondary battery are achieved.

DETAILED DESCRIPTION OF THE EMBODIMENTS

Figure 1:
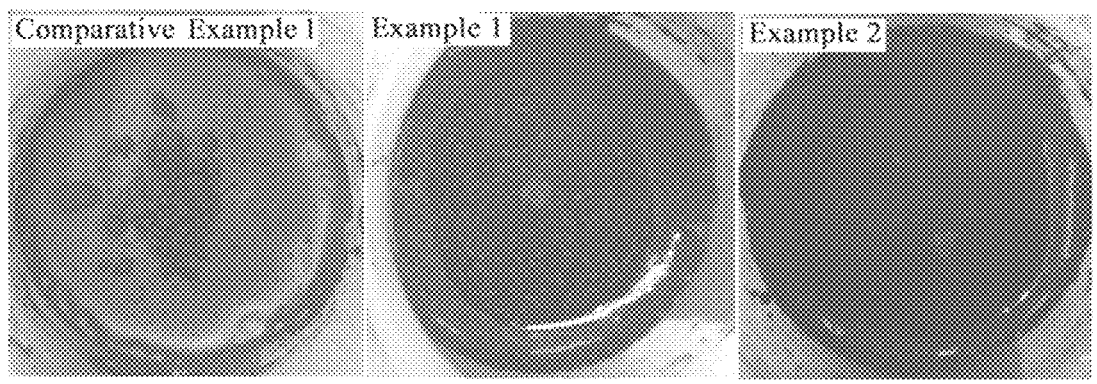
FIG. 1 shows the experimental results of examples 1-2 and comparative Example 1.

It is noted that in the case without departing from the spirit of the disclosure, embodiments in the disclosure and features in the embodiments may be mutually combined. The disclosure is described in detail in combination with the embodiments below. The following embodiments are only exemplary, and are not intend to limit a scope of protection of the disclosure.

As described in the background, the electrical performance of the lithium ion secondary battery is improved by adding propylene carbonate into the negative electrode additive for a lithium ion secondary battery in the prior art generally. However, as the electrical performance and the negative electrode peel strength of such lithium ion secondary battery may still not be entirely satisfactory, it needs to be further improved. As to problems in the prior art, a typical embodiment of the disclosure provides a negative electrode additive for a lithium ion secondary battery which comprises one of a lignin-based substance, a humic acid-based substance, or a combination thereof.

Different from the negative electrode additive for a lithium ion secondary battery in the prior art, in the disclosure, any one of the lignin-based substance, the humic acid-based substance, or a combination thereof is added into the negative electrode additive.

The lignin-based substance is a kind of a polymer material. It is generally used as an anionic surfactant, and because of the good dispersibility thereof, a solid substance may be uniformly dispersed in a aqueous medium.

The humic acid-based substance is a kind of a complex mixture of natural organic high-molecular compounds. It is generally a black or dark brown amorphous powder, and it is slightly dissolved in water and is acidic. The humic acid-based substance of the disclosure is consisted of an aromatic nucleus, a bridge-connected group or a bond, and an active group. The aromatic nucleus is consisted of 5 or 6 benzene ring or heterocycle ring structures, and mainly contains cyclic structures of benzene rings, naphthalene, anthracene, quinone, furan, and pyridine, and the like. The bridge-connected group or bond connected to the aromatic nucleus mainly contains a single-bridge bond or a double-bridge bond, for example, including —O—, —CH$_2$—, —S— and —N—, and the like. In addition, the active group mainly comprises a phenolic hydroxyl, a carboxyl, a methoxyl, an alcoholic hydroxyl, an enolic group, and a carbonyl group, and the like. Because of the above structures, the humic acid-based substance may also act as a surfactant.

In some embodiments of the disclosure, the negative electrode additive for a lithium ion secondary battery may only comprise the lignin-based substance, or the humic acid-based substance, or may also comprise arbitrary combinations of the lignin-based substance and the humic acid-based substance.

A negative electrode containing the negative electrode additive is prepared by the following method: a negative electrode active substance and a conductive agent are uniformly mixed in an aqueous medium, and a thickener is added and stirring is performed, after that, a solution containing the negative electrode additive for a lithium ion secondary battery of the disclosure and deionized water is added and the stirring is continuously performed, finally a binder is added and the stirring is performed until the mixture is uniform, thereby the negative electrode slurry is obtained. The obtained negative electrode slurry is left to rest for a predetermined time, and a metal foil is coated by the obtained slurry, a negative electrode sheet is obtained after drying at 80° C.

In a process of preparing the negative electrode sheet, the negative electrode active substance may be uniformly dispersed in the aqueous medium by adding the negative electrode additive of the disclosure, thereby the negative electrode slurry with good dispersibility is formed. In addition, after the metal foil is coated with the negative electrode active substance, due to the uniform dispersibility, the negative electrode active substance, the thickener and the conductive agent may be bonded to the metal foil well by the binder in the negative electrode slurry, so that the peal strength of the finally formed negative electrode sheet is increased. Therefore, by using the negative electrode additive of the disclosure in preparing the negative electrode sheet, the excellent electrical performance and the excellent peel strength may be achieved.

According to some embodiments of the disclosure, in the case that the negative electrode additive of the disclosure comprises the lignin-based substance, the lignin-based substance may contain one or more of Na$^+$, K$^+$, Ca$^+$, NH$^{4+}$ and Mg$^{2+}$, and may contain one or more of carboxyl, hydroxyl, carbonyl and sulfonic group.

In another embodiment, the negative electrode additive for a lithium ion secondary battery of the disclosure may contain one or more of sodium lignin carboxylate, potassium lignin carboxylate, calcium lignin carboxylate, ammonium lignin carboxylate, magnesium lignin carboxylate, sodium hydroxyl lignin, potassium hydroxyl lignin, calcium hydroxyl lignin, ammonium hydroxyl lignin, magnesium hydroxyl lignin, sodium lignin sulfonate, potassium lignin sulfonate, calcium lignin sulfonate, ammonium lignin sulfonate, and magnesium lignin sulfonate, or a combination comprising at least one of the foregoing.

The lignin-based substance may be applied to various fields, but it is discovered by the inventors when the lignin-based substances described above are used, the best effects of the lignin-based substances may be achieved, and the electrical performance and the negative electrode peel strength of a finished product lithium ion secondary battery may reach an optimal balance.

In the lignin based substances listed above, the most preferable one is the sodium lignin sulfonate. Because of excellent ionization performance of the sodium lignin sulfonate, it may act as the surfactant well, and the negative electrode active substance is dispersed in the negative electrode slurry well.

According to some embodiments of the disclosure, in the case that the negative electrode additive of the disclosure comprises the humic acid-based substance, the humic acid-based substance may comprise one or more of a humic acid, an ulmic acid, and a fulvic acid.

The fulvic acid (yellow humic substance) has a relatively lower molecular weight, and it is yellow generally, and may be dissolved in water, a diluted acid solution, a diluted alkali solution and acetone. The ulmic acid (brown humic substance) has a medium molecular weight, and it is brown generally, and may be dissolved in a diluted caustic solution, acetone or ethyl alcohol, but not dissolved in an acid solution. The humic acid (black humic substance) has a relatively higher molecular weight generally, it is black, and may be dissolved in a diluted caustic solution, but not dissolved in ethyl alcohol or acetone.

As described above, active groups of the humic acid-based substance substantially contain a phenolic hydroxyl, a carboxyl, a methoxyl, an alcoholic hydroxyl, an alkene alcohol group, and a carbonyl group, and the like. These groups may effectively provide good hydrophilicity, ion exchange property, complexing property, oxidation-reduction property and adsorption property for the humic acid-based substance. Therefore, preferably, the humic acid-based substance with a higher molecular weight and more active groups may be used to increase the hydrophilicity of the humic acid-based substance, so that the electrical performance of the lithium ion secondary battery is improved finally.

In some embodiments, based on the total weight of the negative electrode active substance, the amount of the negative electrode additive of the disclosure is about 0.05 wt % to about 5 wt %. As the negative electrode slurry of the lithium ion secondary battery is generally formed by a negative electrode active substance, a binder, a thickener and a conductive agent, and the negative electrode additive of the disclosure is used for effectively dispersing the negative electrode active substance, after a lot of experiments are performed, the inventors discover that within a range of the amount above, the negative electrode active substance may be uniformly dispersed in the negative electrode slurry, and the effects of other components (for example, the binder, the thickener, and the conductive agent) may not be affected adversely.

When the amount of the negative electrode additive is less than about 0.05 wt % of the total weight of the negative electrode active substance, the negative electrode active substance cannot be dispersed in the negative electrode slurry well, so that the electrical performance of the final finished lithium ion secondary battery is poorer. While the amount of the negative electrode additive is greater than about 5 wt % of the total weight of the negative electrode active substance, the performances of the binder and the thickener may be affected adversely, so as to cause a series of problems that the viscosity of the negative electrode slurry is insufficient, the negative electrode slurry cannot be adhered onto a metal foil well, and the peel performance of the negative electrode sheet is reduced, etc.

In some embodiments of the disclosure, as to the different combinations, a lower limit of the amount of the negative electrode additive for a lithium ion secondary battery may be of about 0.05 wt %, about 0.06 wt %, about 0.07 wt %, about 0.1 wt %, about 0.15 wt %, about 0.2 wt %, about 0.25 wt %, about 0.5 wt %, about 0.75 wt %, about 1 wt %, about 1.25 wt %, about 1.5 wt %, about 1.75 wt %, about 2 wt %, about 2.25 wt %, about 2.5 wt %, about 2.75 wt %, about 3 wt %, about 3.25 wt %, about 3.5 wt %, about 3.75 wt %, about 4 wt %, about 4.25 wt %, about 4.5 wt % and about 4.75 wt % of the total weight of the negative electrode active substance, and an upper limit of the amount of the negative electrode additive may be of about 3 wt %, about 3.5 wt %, about 4 wt %, about 4.5 wt % and about 5 wt % of the total weight of the negative electrode active substance.

Specifically, the amount of the negative electrode additive for a lithium ion secondary battery is within a range of about 0.05 wt % to about 3 wt %, about 0.06 wt % to about 3 wt %, about 0.07 wt % to about 3 wt %, about 0.1 wt % to about 3 wt %, about 0.15 wt % to about 3 wt %, about 0.2 wt % to about 3 wt %, about 0.25 wt % to about 3 wt %, about 0.5 wt % to about 3 wt %, about 0.75 wt % to about 3 wt %, about 1 wt % to about 3 wt %, about 1.25 wt % to about 3 wt %, about 1.5 wt % to about 3 wt %, about 1.75 wt % to about 3 wt %, about 2 wt % to about 3 wt %, about 2.25 wt % to about 3 wt %, about 2.5 wt % to about 3 wt %, about 2.75 wt % to about 3 wt %, about 3 wt % to about 5 wt %, about 3.25 wt % to about 5 wt %, about 3.5 wt % to about 5 wt %, about 3.75 wt % to about 5 wt %, about 4 wt % to about 5 wt %, about 4.25 wt % to about 5 wt %, about 4.5 wt % to about 5 wt %, about 4.75 wt % to about 5 wt %, about 0.25 wt % to about 4.5 wt %, about 0.5 wt % to about 4 wt %, about 0.55 wt % to about 3.5 wt % of the total weight of the negative electrode active substance.

In another embodiment of the present disclosure, the negative electrode additive for a lithium ion secondary battery of the disclosure comprises the lignin-based substance and the humic acid-based substance. In the embodiment, when the negative electrode slurry is prepared, a solution containing the lignin-based substance and deionized water and a solution containing the humic acid-based substance and deionized water are simultaneously added to the mixed slurry of the negative electrode active substance, the conductive agent and the thickener, finally the binder is added and stirred uniformly, thereby the negative electrode slurry is obtained. Because each of the lignin-based substance and the humic acid-based substance is an amphoteric polymer, the lignin-based substance and the humic acid-based substance may be promoted each other to dissolve in the negative electrode slurry and the slurry has more excellent dispersibility. In addition, because each of the lignin-based substance and the humic acid-based substance is a long-chain polymer, an entanglement phenomenon may happens in a process that the negative electrode sheet is prepared by drying the slurry, thereby the adhesion effect of the slurry to the metal foil is enhanced, and the peel strength of the negative electrode sheet is improved.

In the above embodiment, further, a weight ratio of the lignin-based substance and the humic acid-based substance is within a range of about 30:70 to about 80:20. In the above range, the negative electrode additive for a lithium ion secondary battery of the disclosure may exist in the negative electrode slurry in a most preferably mixed ratio. In some embodiments of the disclosure, the weight ratio of the lignin-based substance and the humic acid-based substance may be within a range of about 30:70 to about 80:20, about 35:65 to about 75:25, about 40:60 to about 70:30, about 45:55 to about 65:35, and about 50:50 to about 60:40.

In another typical embodiment of the disclosure, a negative electrode slurry for a lithium ion secondary battery is provided, the negative electrode slurry for a lithium ion secondary battery comprises the negative electrode additive for a lithium ion secondary battery described above, a negative electrode active substance, a binder, a thickener and a conductive agent. Because the negative electrode additive for a lithium ion secondary battery of the disclosure is comprised, the negative electrode slurry of the disclosure has the excellent dispersibility, and the lithium ion secondary battery prepared by the negative electrode slurry of the disclosure has the excellent electrical performance and the improved peel strength.

In the embodiment described above, preferably, the negative electrode slurry for a lithium ion secondary battery comprises about 85-95 parts by weight of the negative electrode active substance, about 1-5 parts by weight of the binder, about 1-5 parts by weight of the thickener, and about 1-5 parts by weight of the conductive agent, and the amount of the negative electrode additive for a lithium ion secondary battery is about 0.05 wt % to about 5 wt % of the total weight of the negative electrode active substance. Within the range described above, the negative electrode slurry of the disclosure may be prepared in an optimal mixed ratio, and thus the negative electrode slurry formed has the good dispersibility.

In some embodiments of the disclosure, the negative electrode active substance contained in the negative electrode slurry of the disclosure comprises graphite containing a silicon-based material. The negative electrode active substance comprises one or more negative electrode materials capable of absorbing and releasing lithium which serve as the negative electrode active substance. Examples of the negative electrode material capable of absorbing and releasing lithium include various carbon materials and silicon-based materials, such as hardly graphitizable carbon, easily graphitizable carbon, graphite, pyrolytic carbon, coke, glassy carbon, fired bodies of organic polymers, a carbon fiber, active carbon, a silicon oxide material, and a silicon carbide material, such as a graphite containing a silicon-based material, or a silicon alloy. In these materials, examples of the coke include pitch coke, needle-like coke and petroleum coke. The fired bodies of organic polymers are obtained by baking and carbonizing a polymer material, such as a phenolic resin or a furan resin, at an appropriate temperature. Some fired bodies of organic polymers are classified as the hardly graphitizable carbon or the easily graphitizable carbon. Herein the preferable negative electrode material is the graphite containing the silicon-based material.

The disclosure is further described in detail in combination with the specific examples below, these examples are only for exemplarily illustrating and may not be understood to limit the scope of protection of the present disclosure.

The dispersion effects of the sodium lignin sulfonate and the humic acid to the electrode active substance are observed from the following Example 1, Example 2 and Comparative Example 1, and the experimental results are shown in FIG. 1.

Example 1

0.5 g of a graphite active substance containing a silicon-based material is added into a flask, and then 0.05 g of sodium lignin sulfonate is added, stirring is performed until uniformly mixing, 50 ml of deionized water is added and stirring is performed until the active substance at the bottom is stirred up. After leaving to rest for 30 min, a phenomenon is observed.

Example 2

0.5 g of a graphite active substance containing a silicon-based material is added into a flask, and 0.05 g of a fulvic acid is added, stirring is performed until uniformly mixing, 50 ml of deionized water is added and stirring is performed until the active substance at the bottom is stirred up. After leaving to rest for 30 min, a phenomenon is observed.

Comparative Example 1

0.5 g of a graphite active substance containing a silicon-based material is added into a flask, and 50 ml of deionized water is added and stirring is performed until the active substance at the bottom is stirred up. After leaving to rest for 30 min, a phenomenon is observed.

Experimental Results of Examples 1-2 and Comparative Example 1 are Shown in FIG. 1

By the above examples and comparative example, it may be observed that in Examples 1 and 2 in which the sodium lignin sulfonate and the fulvic acid are added, the electrode active substance is dispersed in a solvent well and a suspension is formed. However, in Comparative Example 1 in which no additive is added, the electrode active substance is suspended on the surface of the solvent. Therefore it may be indicated that in the case of using the additive of the disclosure, the surface tension of the electrode active substance or other substances which need to be added into the electrode may be effectively reduced, thereby it is helpful to the dispersion of them in the electrode slurry, so that each substance of a finally prepared electrode material is uniformly dispersed in the electrode material.

The improvements to a battery and the electrode performance thereof by using the sodium lignin sulfonate and/or the fulvic acid are shown in the following examples and comparative examples.

Example 3

Figure 2:
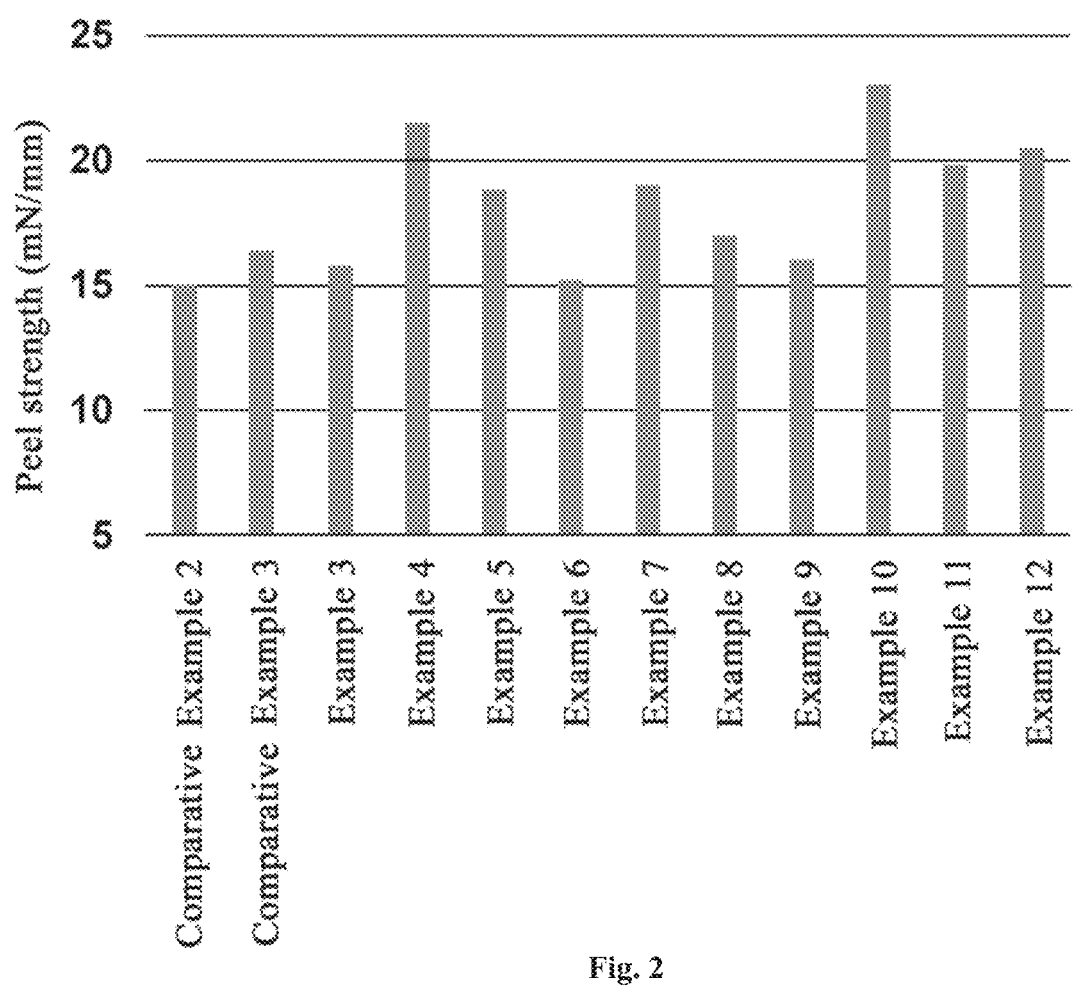
FIG. 2 shows the peel strength test results of examples 3-12 and comparative Examples 2-3.

1) Preparation of a negative electrode sheet: 90 g of graphite containing a silicon-based material (active substance) and 4 g of a conductive agent Super-p are weighed and uniformly mixed, 3 g of a thickener CMC (carboxymethylcellulose) is added and stirring for 15 min, and a solution containing 0.05 wt % of sodium lignin sulfonate (of 0.05 wt % based on the total weight of the active substance) and deionized water is added and stirring for 30 min, finally 3 g of a binder SBR (butadiene styrene rubber) is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Example 4

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and a solution containing 0.5 wt % of sodium lignin sulfonate (of 0.5 wt % based on the total weight of the active substance) and deionized water is added and stirring for 30 min, finally 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Example 5

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and a solution containing 5 wt % of sodium lignin sulfonate (of 5 wt % based on the total weight of the active substance) and deionized water is added and stirring for 30 min, finally 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Example 6

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and a solution containing 0.05 wt % of a fulvic acid (of 0.05 wt % based on the total weight of the active substance) and deionized water is added and stirring for 30 min, finally 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Example 7

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and a solution containing 0.5 wt % of a fulvic acid (of 0.5 wt % based on the total weight of the active substance) and deionized water is added and stirring for 30 min, finally 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Example 8

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and a solution containing 5 wt % of a fulvic acid (of 5 wt % based on the total weight of the active substance) and deionized water is added and stirring for 30 min, finally 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Example 9

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and a solution containing 0.05 wt % of a mixture of sodium lignin sulfonate and fulvic acid (of 0.05 wt % based on the total weight of the active substance) and deionized water is added and stirring for 30 min, herein, a mass ratio of the sodium lignin sulfonate and fulvic acid is 80:20. Finally, 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Example 10

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and a solution containing 0.5 wt % of a mixture of sodium lignin sulfonate and fulvic acid (of 0.5 wt % based on the total weight of the active substance) and deionized water is added and stirring for 30 min, herein, a mass ratio of the sodium lignin sulfonate and fulvic acid is 80:20. Finally, 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Example 11

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and a solution containing 5 wt % of a mixture of sodium lignin sulfonate and fulvic acid (of 5 wt % based on the total weight of the active substance) and deionized water is added and stirring for 30 min, herein, a mass ratio of the sodium lignin sulfonate and fulvic acid is 80:20. Finally, 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Example 12

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and a solution containing 0.05 wt % of a mixture of sodium lignin sulfonate and fulvic acid (of 0.05 wt % based on the total weight of the active substance) and deionized water is added and stirring for 30 min, herein, a mass ratio of the sodium lignin sulfonate and fulvic acid is 30:70. Finally, 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Comparative Example 2

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and finally 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

Comparative Example 3

1) Preparation of a negative electrode sheet: 90 g of graphite containing a silicon-based material (active substance) and 4 g of a conductive agent Super-p are weighed and uniformly mixed, 3 g of a thickener CMC is added and stirring for 15 min, and 0.5 wt % of propylene carbonate based on the weight of the active substance is added and stirring for 15 min, finally 3 g of a binder SBR is added and stirring continuously for 30 min, and then a negative electrode slurry is obtained. The obtained negative electrode slurry is left to rest for 1 h, and a copper foil is coated with the obtained slurry, the negative electrode sheet is obtained by drying at 80° C., and a peel strength test is performed on the negative electrode sheet. A testing result is shown in FIG. 2.

2) Assembling and testing of a battery: the obtained negative electrode sheet is dried at a vacuum oven, at a drying temperature of 100° C., and a vacuum degree of the oven is −90 kPa. After 5 h of the drying, the negative electrode sheet is removed out of the vacuum oven, and following treatment, such as sheet-cutting, rolling and die-cutting, is performed on the negative electrode sheet after cooled. After that, the negative electrode sheet is assembled to prepare an experimental battery of 1 Ah with a positive electrode sheet, and an electrolyte of which $LiPF_6$ concentration is of 1.08 mol/kg is injected into the experimental battery. A capacity test is respectively performed on the battery by using a current of 0.5 C at 25° C. and 0° C. The experimental results are shown in FIG. 1.

TABLE 1 capacity testing results in different temperatures

| | Discharge capacity (mAh) at a normal temperature (25° C.) | Discharge capacity (mAh) at 0° C. | Percentages of capacity at 0° C./capacity at the normal temperature |
|---|---|---|---|
| Example 3 | 1129.4 | 927.2 | 82.1% |
| Example 4 | 1132.1 | 973.6 | 86.0% |
| Example 5 | 1126.0 | 878.3 | 78.0% |
| Example 6 | 1129.1 | 914.6 | 81.0% |
| Example 7 | 1130.5 | 938.3 | 83.0% |
| Example 8 | 1123.3 | 864.9 | 77.0% |
| Example 9 | 1131.0 | 933.1 | 82.5% |
| Example 10 | 1134.0 | 999.1 | 88.1% |
| Example 11 | 1126.5 | 887.7 | 78.8% |
| Example 12 | 1131.0 | 952.3 | 84.2% |
| Comparative Example 2 | 1128.9 | 914.4 | 81.0% |
| Comparative Example 3 | 1129.4 | 927.2 | 82.1% |

It may be observed from the above experimental results that the above examples of the disclosure achieve the following technical effects.

The experimental results of Examples 3-12 show the excellent electrical performance of the discharge capacity at a normal temperature and a low temperature. Moreover, the peel strength of the negative electrode of the lithium ion battery is higher than that of Comparative Example 2 which has no additive and that of Comparative Example 3 which has the existing additive propylene carbonate. Regarding to the examples which have the same components and different content of each component (for example, Examples 3-5), it may be observed that the lithium ion secondary battery of the disclosure shows the optimal electrical performance, and achieves the optimal peel strength while the content of the negative electrode additive for a lithium ion secondary battery is of 0.5 wt %.

The above description are only the preferred embodiments of the disclosure, and are not intend to limit the scopes of the disclosure. Various modifications and variations may be made to the disclosure by those skilled in the art. Within spirits and principles of the disclosure, any modifications, equivalent replacements, improvements and the like shall fall within the protection scope of the disclosure.

What is claimed is:

1. A negative electrode slurry for a lithium ion secondary battery, comprising a negative electrode additive for a lithium ion secondary battery, a negative electrode active substance, a binder, a thickener, and a conductive agent, wherein, the negative electrode additive for a lithium ion secondary battery comprises a lignin-based substance and a humic acid-based substance, wherein an amount of the negative electrode additive is from about 0.5 wt % to about 5 wt %, based on a total weight of the negative electrode active substance.

2. The negative electrode slurry for a lithium ion secondary battery as claimed in claim 1, which comprises about 85-95 parts by weight of the negative electrode active substance; about 1-5 parts by weight of the binder; about 1-5 parts by weight of the thickener; and about 1-5 parts by weight of the conductive agent.

3. The negative electrode slurry for a lithium ion secondary battery as claimed in claim 1 wherein the negative electrode active substance comprises one or more of hardly graphitizable carbon, easily graphitizable carbon, graphite, pyrolytic carbon, coke, glassy carbon, fired bodies of organic polymers, a carbon fiber, active carbon, a graphite containing a silicon-based material, and the silicon-based material.

4. A negative electrode slurry for a lithium ion secondary battery, comprising a negative electrode additive for a lithium ion secondary battery, a negative electrode active substance, a binder, a thickener, and a conductive agent,
wherein, the negative electrode additive for a lithium ion secondary battery comprises a lignin-based substance and a humic acid-based substance,
a weight ratio of the lignin-based substance and the humic acid-based substance ranges from about 30:70 to about 80:20, and
wherein an amount of the negative electrode additive is from about 0.5 wt % to about 5 wt % based on a total weight of the negative electrode active substance.

5. The negative electrode slurry for a lithium ion secondary battery as claimed in claim 4, which comprises about 85-95 parts by weight of the negative electrode active substance; about 1-5 parts by weight of the binder; about 1-5 parts by weight of the thickener; and about 1-5 parts by weight of the conductive agent.

6. The negative electrode slurry for a lithium ion secondary battery as claimed in claim 4 wherein the negative electrode active substance comprises one or more of hardly graphitizable carbon, easily graphitizable carbon, graphite, pyrolytic carbon, coke, glassy carbon, fired bodies of organic polymers, a carbon fiber, active carbon, a graphite containing a silicon-based material, and the silicon-based material.

* * * * *